United States Patent
Wallaja

(10) Patent No.: US 9,275,379 B2
(45) Date of Patent: Mar. 1, 2016

(54) METHOD FOR MUTUAL AUTHENTICATION OF A USER AND SERVICE PROVIDER

(75) Inventor: Resh Wallaja, San Francisco, CA (US)

(73) Assignee: Kachyng, Inc., San Francisco, CA (US)

(*) Notice: Subject to any disclaimer, the term of this patent is extended or adjusted under 35 U.S.C. 154(b) by 310 days.

(21) Appl. No.: 13/637,998

(22) PCT Filed: Mar. 31, 2011

(86) PCT No.: PCT/IB2011/051382
§ 371 (c)(1),
(2), (4) Date: Sep. 28, 2012

(87) PCT Pub. No.: WO2011/121566
PCT Pub. Date: Oct. 6, 2011

(65) Prior Publication Data
US 2013/0024923 A1    Jan. 24, 2013

(30) Foreign Application Priority Data

Mar. 31, 2010 (IN) .............................. 915/CHE/2010
Apr. 22, 2010 (IN) .............................. 154/CHE/2010

(51) Int. Cl.
*G06F 15/16* (2006.01)
*G06Q 20/00* (2012.01)
*H04L 9/32* (2006.01)
*H04L 29/06* (2006.01)

(52) U.S. Cl.
CPC ................ *G06Q 20/00* (2013.01); *H04L 9/321* (2013.01); *H04L 9/3228* (2013.01); *H04L 63/18* (2013.01)

(58) Field of Classification Search
None
See application file for complete search history.

(56) References Cited

U.S. PATENT DOCUMENTS

| 7,548,620 | B2* | 6/2009 | Popp ..................... H04L 9/3263 380/262 |
| 8,108,903 | B2* | 1/2012 | Norefors et al. ................... 726/2 |
| 8,582,734 | B2* | 11/2013 | Chen ....................... G06F 21/34 379/93.02 |
| 2004/0039651 | A1* | 2/2004 | Grunzig et al. ................. 705/26 |
| 2006/0069914 | A1* | 3/2006 | Rupp ........................ H04L 9/32 713/168 |

(Continued)

OTHER PUBLICATIONS

Long, "Roaming Authentication and End-to-End Authentication in Wireless Security". Dissertation from Auburn University, Auburn, Alabama, Aug. 8, 2005 retrieved on Jul. 27, 2011 from the internet [http://etd.auburn.edu/etd/bistream/handle/10415/759/LONG_MEN_56.pdf?sequence=1], sections 2.2, p. 14; 2.2.2, p. 15; and 3.2.2, p. 22.

(Continued)

*Primary Examiner* — Joshua Joo
(74) *Attorney, Agent, or Firm* — Fenwick & West LLP

(57) ABSTRACT

The present invention relates to a method and system for mutual authentication of a user and service provider, said method comprising acts of: authenticating an event by a key generation module (KGM), said event is generated on a computing device by a user, sending a shared secret of registered user for the event by an authentication server to the key generation module (KGM), generating one time key by the KGM for the event, transmitting the one time key by appending the shared secret to registered user mobile device, and performing at least one of: authenticating the user for said event by the KGM when a registered user enters the one-time key on the computing device within a predetermined time period, or terminating the event upon receipt of predefined key sequence from the mobile device.

9 Claims, 4 Drawing Sheets

(56) References Cited

U.S. PATENT DOCUMENTS

| | | |
|---|---|---|
| 2006/0205388 A1 | 9/2006 | Semple et al. |
| 2007/0079135 A1* | 4/2007 | Saito ............................. 713/183 |
| 2007/0124490 A1* | 5/2007 | Kalavade et al. ............. 709/230 |
| 2007/0168432 A1* | 7/2007 | Lustgarten et al. ........... 709/206 |
| 2008/0046738 A1* | 2/2008 | Galloway et al. ............ 713/176 |
| 2008/0103984 A1* | 5/2008 | Choe et al. ...................... 705/76 |
| 2009/0164785 A1 | 6/2009 | Metke et al. |
| 2009/0205036 A1* | 8/2009 | Slaton ................... H04L 63/083 726/9 |
| 2009/0254745 A1 | 10/2009 | Ganesan |
| 2009/0259848 A1* | 10/2009 | Williams et al. .............. 713/168 |
| 2009/0271868 A1* | 10/2009 | Ogawa ............................ 726/26 |
| 2009/0307767 A1* | 12/2009 | Semba ............................ 726/18 |
| 2010/0269162 A1* | 10/2010 | Bravo ..................... G06F 21/31 726/6 |
| 2010/0274853 A1* | 10/2010 | Carlson et al. ................ 709/204 |
| 2010/0332832 A1* | 12/2010 | Wu et al. ........................ 713/169 |
| 2011/0185406 A1* | 7/2011 | Hirson et al. ..................... 726/6 |
| 2012/0094647 A1* | 4/2012 | Aftab et al. ................... 455/419 |
| 2014/0237575 A1* | 8/2014 | Geil .................................. 726/7 |

OTHER PUBLICATIONS

International Search Report PCT/IB2011/051382, mailed Aug. 3, 2011; ISA/US.

International Preliminary Report on Patentability, completed May 31, 2012; IPEA/US.

* cited by examiner

METHOD FOR MUTUAL AUTHENTICATION OF A USER AND SERVICE PROVIDER

CROSS-REFERENCE TO RELATED APPLICATIONS

This application is a 371 U.S. National Stage of International Application No. PCT/IB2011/051382, filed on Mar. 31, 2011, which claims priority to Indian Patent Application No. 915/CHE/2010, filed on Mar. 31, 2010, and Indian Patent Application No. 154/CHE/2010, filed on Apr. 22, 2010. The contents of the above applications are incorporated herein by reference in their entirety.

TECHNICAL FIELD

Embodiments of the present disclosure relate to a mutual authentication between user and a service provider. More specifically, embodiments relate to a method of mutual authentication using secondary verification using out of band communication.

BACKGROUND

In electronic commerce, online transaction wherein a client logs into his/her bank or financial institutions account via the web-site offered by the financial institution has always fallen prey to hackers and phishers who guess login-id and passwords and perform fraud. The Financial transaction world has tried to avoid this by making passwords more and more complicated, login-id more obscure, images recognition, etc. The hackers and the phishers have always outsmarted them with newer techniques like key logging, transparent proxy-ing, dynamic DNS re-routing, etc.

As electronic commerce expands, so does electronic fraud and identity theft. Because a single factor is sufficient to access a user account or perform a transaction, fraud and identity theft only requires a perpetrator to acquire the single factor knowledge. A consequence of the broad acceptance of single factor authentication is, therefore, broad and pervasive fraud and identity theft. Also, for example, a user accessing his financial account on-line is not sure whether the transaction he as initiate is with genuine financial institution website or with some hacker trying to impersonate the financial institution website. Hence there is a need to address the above mentioned issues.

In light of forgoing discussion, there is a need for mutual authentication between user and a service provider to overcome the limitations stated above.

SUMMARY

The shortcomings of the prior art are overcome and additional advantages are provided through the provision of a method, device and a system as described in the description.

In one embodiment, the present disclosure provides a method for mutual authentication of user and a service provider by authenticating an event by a key generation module (KGM) wherein said even is generated on a computing device by a user, sending a shared secret of registered user for the event by an authentication server to a the KGM, generating one time key by the KGM for the initiated event, transmitting the one time key by appending the shared secret to registered user mobile device either as audio or video. Authenticating the user for said event by the KGM when a registered user enters the one-time key on the computing device within a predetermined time period. Alternatively, terminating the event by the KGM upon receipt of predefined key sequence from the mobile device.

In one embodiment, the KGM is a service provider server.

In one embodiment, the KGM comprises a service provider server and third party server.

In one embodiment, the event to be authenticated is transmitted by the service provider server to the authentication server through the third party server, said authentication server provides the shared secret to the third party server.

In an alternative embodiment, the third party server generates the one time key.

In one embodiment the event is terminated by locking the registered user's account.

In one embodiment the appended key is transmitted using at least one of the communication channel including but is not limiting to Single Data Message Format (SDMF), Unstructured Supplementary Services Data (USSD), 3G video over voice and GPRS.

In one embodiment, the event is initiated by providing a missed call to the KGM.

In one embodiment, a mobile application is automatically invoked upon receipt of an authentication command on the mobile device to display the appended key.

In one embodiment, the shared secret includes but is not limiting to images, sound, word, phrase, numerical numbers and alphanumeric word.

In one embodiment, the one time key includes but is not limiting to symbol, alphanumeric word, and numerical numbers.

In one embodiment, the authentication server generates a digital code and transmits it along with mobile number of the registered user to the service provider to unlock the registered user's account upon receipt of unlock request from the registered user.

In one embodiment, the present disclosure also provides a system for authenticating a user, said system comprising: a computing device to initiate an event to be authenticated, a KGM configured to generate a one time key for the initiated event and appending the generated one-time key with shared secret of a user registered with a service provider, mobile device to receive the appended key from the server, wherein the user upon receipt of the appended key on his mobile device either as audio or video performs at least one of:
  entering the one-time key on the computing device for authenticating the user for said event, or
  pressing a predefined key sequence on the mobile device to lock the user's account to terminate the event, if the event is not initiated by the user.

In one embodiment, the server transmits the appended key to the mobile device using at least one of the communication channel selected from the group comprising Single Data Message Format (SDMF), Multiple Data Message Format (MDMF), Unstructured Supplementary Services Data (USSD), 3G video over voice, interactive voice response IVR, place telephone call and GPRS.

In one embodiment the computing device includes but is not limiting to Automated Teller Machine (ATM), computer, mobile phone, Personal Digital Assistance (PDA), Point of Sale (POS) terminal, any device capable of doing e-banking and other related devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF FIGURES

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

DETAIL DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Figure 1:
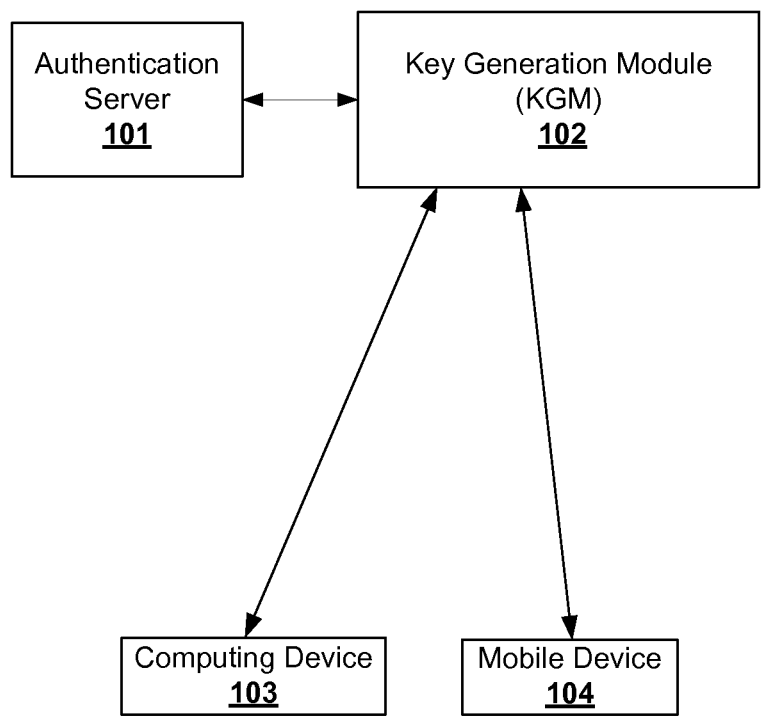
FIG. 1 illustrates a block diagram for two way authentications for an event according to one embodiment of the disclosure.

FIG. 1 illustrates an embodiment wherein an event to be authenticated is generated by user on a computing device 103. For example, the event could be user swiping a credit card on a point of sale terminal (POS). Once the event is generated a key generation module (KGM) 102 generates a one time key for the event to be authenticated. This one time key has to be entered by the user on the POS to complete the transaction. The KGM 102 will check for the corresponding user details of the credit card in an authentication server 101. The authentication server 101 stores details of the credit card and its user who has registered his name in the authentication server 101. Along with other user details, the authentication server 101 stores mobile number of the user mobile device and a secret shared by the registered user. The KGM 102 fetches the shared secret and the mobile number of the registered user for the credit card. The one time key is then appended with the shared secret and is sent to the mobile device. The registered user receives and checks for shared secret. If the shared secret is same as one which he has already shared with the authentication server during registration, the registered user is sure about receiving the one time key form an authorized source and not from a impersonate party.

Now, if the user who initiated the event is same as the one who receives the appended key, then the user enters the one time key on to the POS to authenticate himself with the KGM. Thus KGM authenticates the event when it receives the valid one-time key associated with the event. This will enable the event to be processed further. Thus by using the shared secret and one time key mutual authentication is achieved.

If the user who initiated the event is not the registered user, then he would not receive the one time key to enter in to enter on to the POS thus terminating the event by the KGB as it did not receive the valid one-time key associate with the event within a predefined time. Also, the registered user who receives the appended key having shared secret and one time key will have a choice to terminate the event or to lock his account by pressing a predetermined key on his mobile device.

Figure 2:
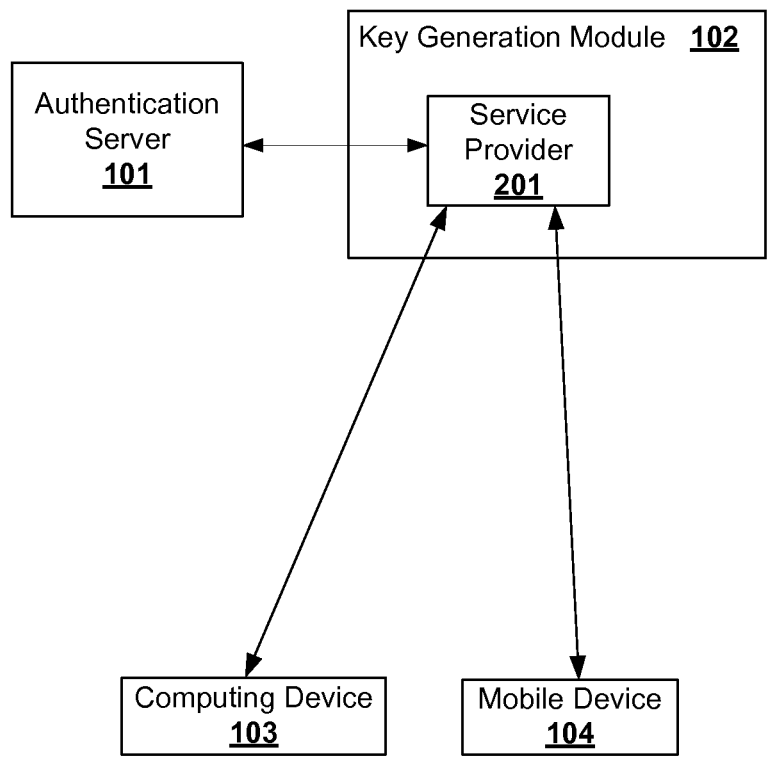
FIG. 2 illustrates a block diagram of one exemplary embodiment where service provider acts as a key generation module.

FIG. 2 shows one exemplary embodiment of the disclosure. User registers a phone number with customers account information within a financial institution such as a bank. This concept can be applied to other business/commerce entities as well that would like to allow its customers to purchase good online and make payment online via a mobile device. The process creates a non-repudiation overlay channel wherein the two parties that enter into a transaction of any type can fallback onto an accepted level of commitment upon themselves to honour the transaction. The mutual acceptance of the performance of a transaction is conducted in real-time before the transaction is completed. If the performance level is unacceptable to any party then the transaction is considered as failure and no annoyance or mistrust is created. The process uses an out-of-band channel of communication for the mutual authentication to be performed. The out-of-band communication channel is the mobile/cellular network, which is secure and robust. The process is not restrictive of having other media of communication to be incorporated into this out-of-band communication method, if desired. As an example, let bank be a service provider who stores all customer's information in an authentication server. The authentication server also stores a shared secret between the service provider and the customer.

User or customer initiates an event with a service provider by making a financial transaction, for example to transfer money form his account to other account on a computer. When the user initiates the event, the service provider 201 will generate a one time key for the event. Also, the service provider 201 will check for the corresponding user details for the transaction in an authentication server 101. The authentication server 101 will have the details of users who have registered his name with the authentication server 101. The user who initiated the event has to enter the one time key onto the computer to complete the transaction.

Along with other user details stored in the authentication server 101, the server 101 comprises mobile number of the user mobile device and a secret shared by the registered user. The service provider 201 fetches the shared secret and the mobile number of the registered user for the credit card. The one time key is then appended with the shared secret and is sent to the mobile device. The registered user receives and checks for shared secret. If the shared secret is same as one which he as already shared with the authentication server during registration, the registered user is sure about receiving the one time key form an authorized source and not from a impersonate party.

Now, if the user who initiated the event is same as the one who receives the appended key, then the user enters the one time key on to the computing device 103 which is computer in this example to authenticate himself with the service provider. This will enable the event to be processed further. Thus by using the shared secret and one time key mutual authentication is achieved.

If the user who initiated the event is not the registered user, then he would not receive the one time key to enter in to computing device 103 and thus results in terminating the event. The event would terminated if the one-time key is not enter on the computing device 103 within a predefined amount of time, say for example 15 minutes, or when a invalid/wrong key is entered. Also, the registered user who receives the appended key having shared secret and one time key will have a choice to terminate the event or/and to lock his account. This is achieved by user entering a predetermined key sequence on his mobile device which will be sent to the service provider 201.

Figure 3:
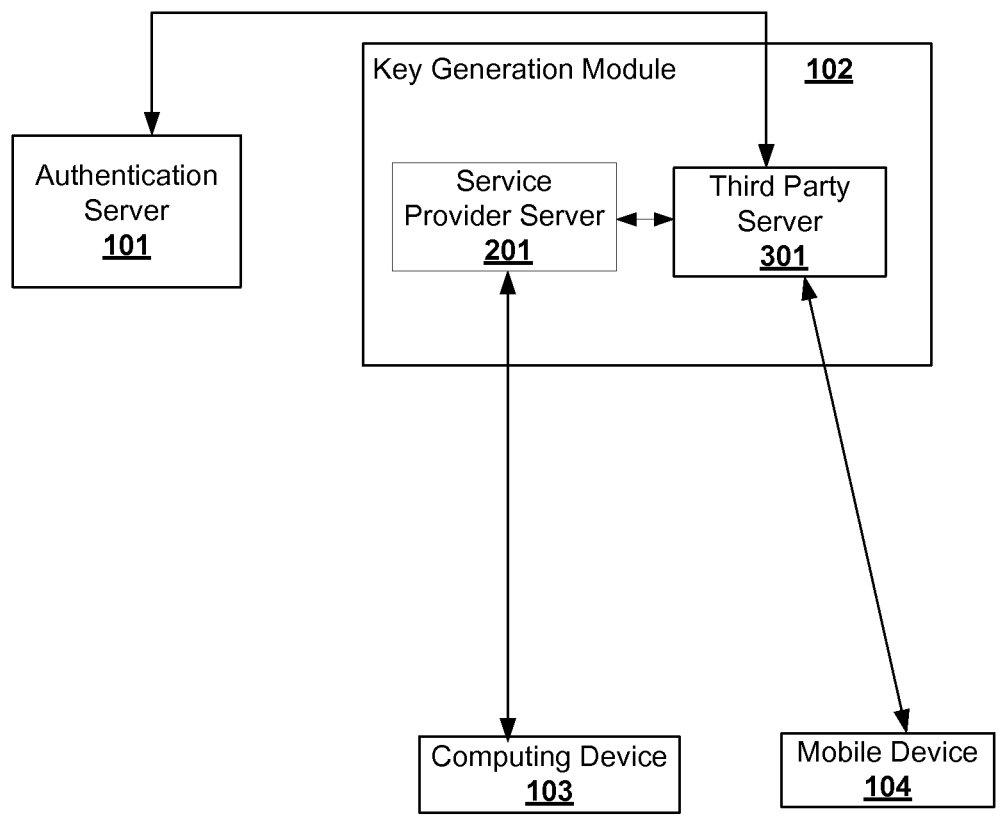
FIG. 3 illustrates a block diagram of one exemplary embodiment where a third party server generates a one time key.

FIG. 3 illustrates an alternative embodiment for mutually authenticating the event. When an event is generated, for example, online purchase of a commodity using a debit card on a computer, the service provider authenticates a third party server 301 to provide mutually authentication for the event. The third party server 301 then generates one time key for the event. Also, the third party server 301 will check for the corresponding user details for the event from the authentication server 101. The authentication server 101 stores details of the debit card and its user who has registered his name in the authentication server 101. The user who initiated the event has to enter the one time key on to the computer to complete the transaction.

Along with other user details stored in the authentication server 101, the server 101 comprises mobile number of the user mobile device and a secret shared by the registered user. The third party server 301 fetches the shared secret and the mobile number of the registered user for the debit card. The one time key is then appended with the shared secret and is sent to the mobile device. The registered user receives and checks for shared secret. If the shared secret is same as one which he as already shared with the authentication server during registration, the registered user is sure about receiving the one time key form an authorized source and not from a impersonate party.

Now, if the user who initiated the event is same as the one who receives the appended key, then the user enters the one time key on to the computer to authenticate himself with the third party server 301. This will enable the event to be processed further. Thus by using the shared secret and one time key mutual authentication is achieved.

If the user who initiated the event is not the registered user, then he would not receive the one time key to enter in to enter on to the computer to complete the transaction thus terminating the event. The event will be automatically terminated by the third party server 301 if a valid key is not entered with a predefined time period. Also, the registered user who receives the appended key having shared secret and one time key will have a choice to terminate the event or to lock his account by pressing a predetermined key on his mobile device. The third party server 301 when received the predetermined key sequence from the mobile device it would terminate the event and/or lock his account.

The appended key is transmitted to the mobile device either as audio or video or using a caller ID mechanism or any other technically feasible means. The shared secret or credential might be a sound file, an image, or a PIN. It could also be a unique string, alphanumeric word, special characters, number sequence or a video.

This new process creates a process of registering a phone number which will be related to the customers account information within a financial institution such as a bank. This concept can be applied to other business/commerce entities as well that would like to allow its customers to purchase good online and make payment online. The process creates a non-repudiation overlay channel wherein the two parties that enter into a transaction of any type can fallback onto an accepted level of commitment upon themselves to honour the transaction. The mutual acceptance of the performance of a transaction is conducted in real-time before the transaction is completed. If the performance level is unacceptable to any party then the transaction is considered a failure and no annoyance or mistrust is created. The process uses an out-of-band channel of communication for the mutual authentication to be performed. The out-of-band communication channel is the mobile/cellular network, which is secure and robust. The process is not restrictive of having other media of communication to be incorporated into this out-of-band communication method, if desired.

Figure 4:
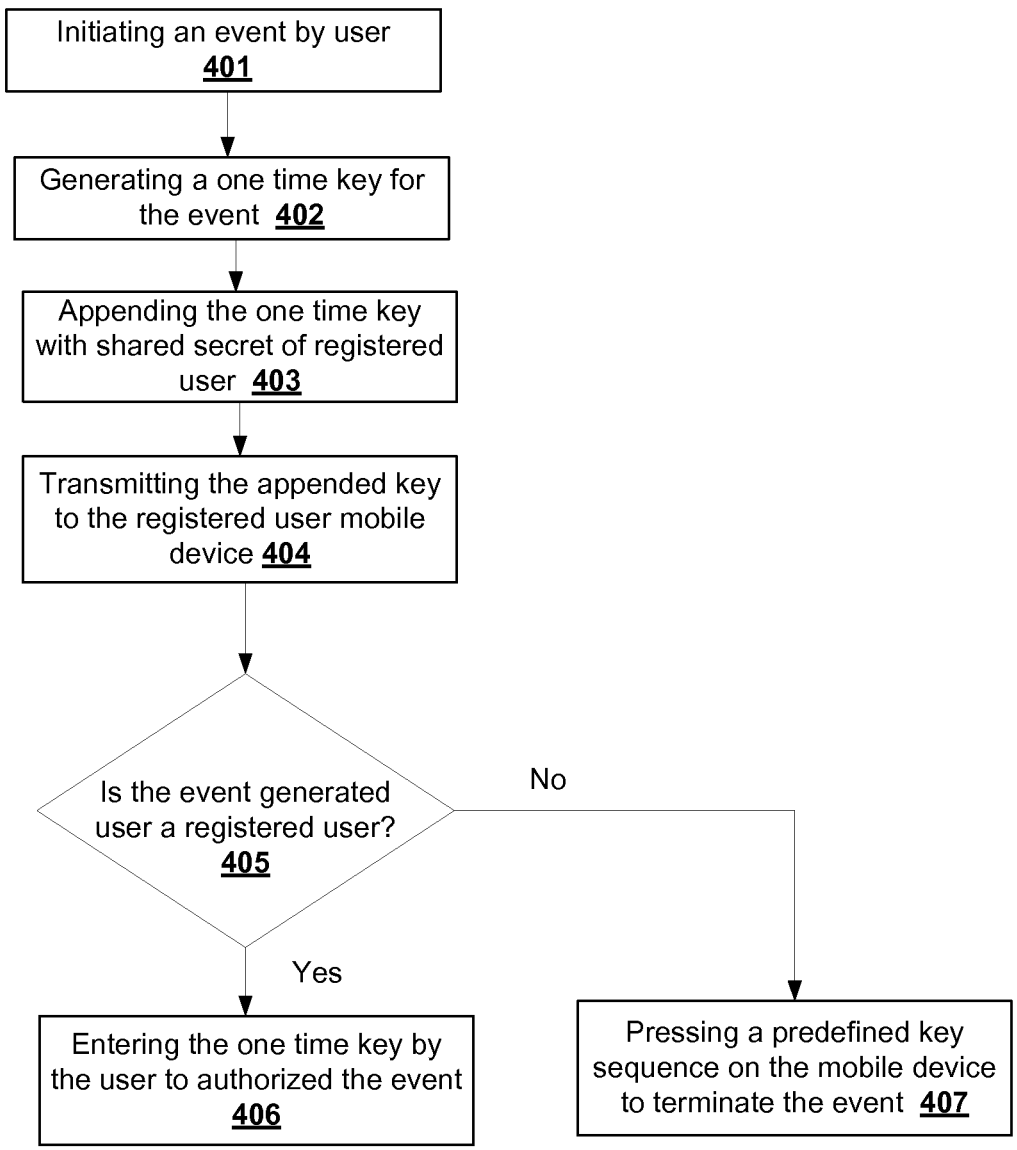
FIG. 4 is a flow diagram illustrates step by step process for carrying out two way authentication.

FIG. 4 is a flow diagram of method for authorizing a user, according to one embodiment of the invention. Although the method steps are described in conjunction with FIG. 1-3, persons skilled in the art will understand that any system configured to perform the method steps, in any order, is within the scope of the invention.

The method begins in step 401, where an authorization event is initiated by user. In one embodiment, the authorization request is initiated when the user attempts to log into a web page, presenting a user name and password as authorization credentials for financial transaction. In an alternate embodiment, the user may present a card or other form of identification device to initiate an authorization request like using a credit for shopping. In one embodiment the event could be generated after user login into his account by providing appropriate credentials for authentication.

In step 402 a one time key is generated for the event by a KGM. This one time key is then appended with the shared secret of the user. The append key is then transmitted to registered user mobile device at step 404. If the registered user has initiated the event then he would enter the one time key to complete the event 406. the KGM if receives the one time key it would authenticate the event. The shared secret will confirm the registered user that the one time key has not been initiated by any impersonator. If the registered user has not initiated the event then he would terminate the event or lock his account or both by pressing predefined sequence on the mobile device 407. When the KGM receives the predefined sequence form the mobile device then it would initiate action to either terminate the event or lock the user account or do both. Further, if the user who initiated the event would not receive the one time key which is required to complete the event on his mobile device. Thus by not entering the one time key the event is automatically terminated. In one embodiment the event is terminated by KGM if one time key is not entered to with predefined time period.

In one embodiment, a register user generates an event by providing a missed call or by sending an SMS to the KGM.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for mutual authentication of a user and service provider, the method comprising:
   receiving, at a key generation module (KGM), a notification of an event generated at a computing device, the KGM comprising a service provider server and a third party server,
   transmitting the notification of the event to an authentication server via the service provider server,
   receiving, at the third party server, a shared secret provided by a registered user for the event, the shared secret transmitted to the KGM by the authentication server,
   generating, by the KGM, a one time key for the event,
   appending the shared secret to the one time key to generate an appended key,
   transmitting the appended key to a registered user mobile device, and
   performing at least one of:
      authentication of the event by the KGM in response to a registered user entering the one-time key on the computing device within a predetermined time period, and
      termination of the event upon receipt of a predefined key sequence from the mobile device.

2. The method of claim 1, wherein the one time key is generated by the third party server.

3. The method of claim 1, wherein the appended key is transmitted using at least one of Single Data Message Format (SDMF), Multiple Data Message Format (MDMF), Unstructured Supplementary Services Data (USSD), 3G video over voice, interactive voice response (IVR), placed telephone call and general packet radio service (GPRS).

4. The method of claim 1, wherein the event is initiated by providing a missed call from the computing device to the KGM.

5. The method of claim 1, wherein transmitting the one time key to the mobile device comprises invoking automatically a mobile application on the mobile device to display the appended key.

6. The method of claim 1, wherein the shared secret is at least one of an image, a sound, a word, a phrase, a number, and an alphanumeric word.

7. The method of claim 1, wherein the one time key is at least one of a symbol, an alphanumeric word, and a number.

8. The method of claim 1, wherein the service provider server receives a digital code generated by the authentication server and transmitted to the service provider server with a mobile number of the mobile device, the digital code unlocking the registered user's account upon receipt of an unlock request from the registered user.

9. The method of claim 1, further comprising locking the registered user's account upon receipt of the predefined key sequence from the mobile device.

* * * * *